US009846581B2

(12) United States Patent
Huang et al.

(10) Patent No.: US 9,846,581 B2
(45) Date of Patent: Dec. 19, 2017

(54) METHOD AND APPARATUS FOR ASYNCHRONOUS PROCESSOR PIPELINE AND BYPASS PASSING

(71) Applicant: Huawei Technologies Co., Ltd., Shenzhen (CN)

(72) Inventors: Tao Huang, Ottawa (CA); Yiqun Ge, Ottawa (CA); Qifan Zhang, Lachine (CA); Wuxian Shi, Kanata (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 480 days.

(21) Appl. No.: 14/480,556

(22) Filed: Sep. 8, 2014

(65) Prior Publication Data

US 2015/0074380 A1     Mar. 12, 2015

Related U.S. Application Data

(60) Provisional application No. 61/874,794, filed on Sep. 6, 2013, provisional application No. 61/874,810, filed
(Continued)

(51) Int. Cl.
*G06F 9/38* (2006.01)
*G06F 15/80* (2006.01)
(Continued)

(52) U.S. Cl.
CPC ............ *G06F 9/30145* (2013.01); *G06F 1/08* (2013.01); *G06F 1/10* (2013.01); *G06F 9/30036* (2013.01);
(Continued)

(58) Field of Classification Search
CPC .... G06F 9/3885; G06F 9/3826; G06F 9/3828; G06F 9/3877; G06F 2009/3883; G06F 15/8053
See application file for complete search history.

(56) References Cited

U.S. PATENT DOCUMENTS 5,430,884 A * 7/1995 Beard ..................... G06F 8/433
                                                                 708/520
5,598,113 A    1/1997 Jex et al.
(Continued)

FOREIGN PATENT DOCUMENTS

EP            0 335 514 A2    10/1989
EP            0 529 369 A2     3/1993
(Continued)

OTHER PUBLICATIONS

John L. Hennessy & David A. Patterson, Computer Architecture A Quantitative approach, (4th Ed. 2007), pp. 92-97, A-17, A-18, E-56 to E-62.*
(Continued)

*Primary Examiner* — Yuqing Xiao
(74) *Attorney, Agent, or Firm* — Slater Matsil, LLP

(57) ABSTRACT

A clock-less asynchronous processor comprising a plurality of parallel asynchronous processing logic circuits, each processing logic circuit configured to generate an instruction execution result. The processor comprises an asynchronous instruction dispatch unit coupled to each processing logic circuit, the instruction dispatch unit configured to receive multiple instructions from memory and dispatch individual instructions to each of the processing logic circuits. The processor comprises a crossbar coupled to an output of each processing logic circuit and to the dispatch unit, the crossbar configured to store the instruction execution results.

18 Claims, 12 Drawing Sheets

Related U.S. Application Data on Sep. 6, 2013, provisional application No. 61/874,856, filed on Sep. 6, 2013, provisional application No. 61/874,914, filed on Sep. 6, 2013, provisional application No. 61/874,880, filed on Sep. 6, 2013, provisional application No. 61/874,889, filed on Sep. 6, 2013, provisional application No. 61/874,866, filed on Sep. 6, 2013.

(51) Int. Cl.

| | | |
|---|---|---|
| *G06F 15/82* | (2006.01) | |
| *G06F 9/30* | (2006.01) | |
| *G06F 1/08* | (2006.01) | |
| *G06F 1/10* | (2006.01) | |
| *G06F 9/50* | (2006.01) | |

(52) U.S. Cl.
CPC .......... *G06F 9/3826* (2013.01); *G06F 9/3828* (2013.01); *G06F 9/3851* (2013.01); *G06F 9/3853* (2013.01); *G06F 9/3871* (2013.01); *G06F 9/3877* (2013.01); *G06F 9/3885* (2013.01); *G06F 9/3891* (2013.01); *G06F 9/5011* (2013.01); *G06F 15/8053* (2013.01); *G06F 2009/3883* (2013.01)

(56) References Cited

U.S. PATENT DOCUMENTS

| | | | |
|---|---|---|---|
| 5,758,176 A * | 5/1998 | Agarwal | G06F 9/3001 |
| | | | 712/209 |
| 5,842,034 A * | 11/1998 | Bolstad | G06F 13/4022 |
| | | | 712/11 |
| 5,987,620 A | 11/1999 | Tran | |
| 6,108,769 A * | 8/2000 | Chinnakonda | G06F 9/30036 |
| | | | 712/216 |
| 6,633,971 B2 * | 10/2003 | Peng | G06F 9/3824 |
| | | | 712/218 |
| 6,658,581 B1 | 12/2003 | Takahashi et al. | |
| 7,313,673 B2 | 12/2007 | Abernathy et al. | |
| 7,353,364 B1 | 4/2008 | Chong et al. | |
| 7,376,812 B1 | 5/2008 | Sanghavi et al. | |
| 7,533,248 B1 | 5/2009 | Golla et al. | |
| 7,605,604 B1 | 10/2009 | Young | |
| 7,681,013 B1 | 3/2010 | Trivedi et al. | |
| 7,698,505 B2 | 4/2010 | Temple, III | |
| 7,752,420 B2 | 7/2010 | Izawa et al. | |
| 7,936,637 B2 | 5/2011 | Shori | |
| 8,005,636 B2 | 8/2011 | Shipton et al. | |
| 8,125,246 B2 | 2/2012 | Grochowski et al. | |
| 8,307,194 B1 | 11/2012 | Scott et al. | |
| 8,464,025 B2 | 6/2013 | Yamaguchi et al. | |
| 8,689,218 B1 | 4/2014 | Awad et al. | |
| 2002/0124155 A1 * | 9/2002 | Sami | G06F 9/3826 |
| | | | 712/218 |
| 2002/0156995 A1 | 10/2002 | Martin et al. | |
| 2003/0065900 A1 | 4/2003 | Mes | |
| 2004/0046590 A1 | 3/2004 | Singh et al. | |
| 2004/0064750 A1 | 4/2004 | Conway | |
| 2004/0103224 A1 | 5/2004 | Duresky et al. | |
| 2004/0215772 A1 | 10/2004 | Dinker et al. | |
| 2005/0038978 A1 | 2/2005 | Nickolls et al. | |
| 2005/0251773 A1 | 11/2005 | Bair et al. | |
| 2006/0075210 A1 | 4/2006 | Manohar et al. | |
| 2006/0176309 A1 | 8/2006 | Gadre et al. | |
| 2006/0242386 A1 | 10/2006 | Wood | |
| 2006/0277425 A1 * | 12/2006 | Renno | G06F 1/3203 |
| | | | 713/323 |
| 2007/0150697 A1 | 6/2007 | Sachs | |
| 2007/0186071 A1 | 8/2007 | Bellows et al. | |
| 2008/0238494 A1 | 10/2008 | Ortiz et al. | |
| 2009/0217232 A1 | 8/2009 | Beerel et al. | |
| 2010/0278190 A1 | 11/2010 | Yip et al. | |
| 2010/0313060 A1 * | 12/2010 | Bjorklund | G06F 9/30032 |
| | | | 713/600 |
| 2011/0057699 A1 | 3/2011 | Szczypinski | |
| 2011/0072236 A1 * | 3/2011 | Mimar | G06F 9/3001 |
| | | | 712/4 |
| 2011/0072238 A1 | 3/2011 | Mimar | |
| 2012/0066480 A1 | 3/2012 | Hanaki et al. | |
| 2012/0159217 A1 * | 6/2012 | Venkataramanan | G06F 1/3203 |
| | | | 713/323 |
| 2013/0024652 A1 * | 1/2013 | Bailey | H04N 19/127 |
| | | | 712/3 |
| 2013/0080749 A1 | 3/2013 | Ito et al. | |
| 2013/0331954 A1 | 12/2013 | McDonnell et al. | |
| 2013/0346729 A1 * | 12/2013 | Barowski | G06F 9/3836 |
| | | | 712/214 |
| 2014/0189316 A1 * | 7/2014 | Govindu | G06F 9/30079 |
| | | | 712/220 |
| 2014/0281370 A1 * | 9/2014 | Khan | G06F 9/30036 |
| | | | 712/7 |
| 2015/0074443 A1 | 3/2015 | Huang et al. | |
| 2015/0074446 A1 | 3/2015 | Tong et al. | |

FOREIGN PATENT DOCUMENTS

| | | |
|---|---|---|
| EP | 0 328 721 B1 | 4/1995 |
| WO | WO 2006/055546 A2 | 5/2006 |

OTHER PUBLICATIONS

Laurence, "Low-Power High-Performance Asynchronous General Purpose ARMv7 Processor for Multi-core Applications," presentation slides, 13th Int'l Forum on Embedded MPSoC and Multicore, Jul. 2013, Octasic Inc., 52 pages.*

Michel Laurence, "Introduction to Octasic Asynchronous Processor Technology," May 2012, IEEE 18th International Symposium on Asynchronous Circuits and Systems, pp. 113-117.*

IEEE 100 The Authoritative Dictionary of IEEE Standards Terms, 7th Ed., 2000, p. 252.*

Ivan E. Sutherland, "Micropipelines", Communications of the ACM, vol. 32, No. 6, Jun. 1989, p. 720-738.

Berekovic et al., "A programmable co-processor for MPEG-4 video," Proceedings, IEEE International Conference on Acoustics, Speech, and Signal Processing, May 2001, pp. 1021-1024.

Wada et al., "A VLIW Vector Media Coprocessor With Cascaded SIMD ALUs," IEEE Transactions on Very Large Scale Integration (VLSI) Systems, vol. 17, No. 9, Sep. 2009, pp. 1285-1295.

* cited by examiner

METHOD AND APPARATUS FOR ASYNCHRONOUS PROCESSOR PIPELINE AND BYPASS PASSING

CROSS REFERENCE TO RELATED APPLICATIONS

This application claims priority under 35 USC 119(e) to U.S. Provisional Applications Ser. No. 61/874,794, 61/874,810, 61/874,856, 61/874,914, 61/874,880, 61/874,889, and 61/874,866, all filed on Sep. 6, 2013, and all of which are incorporated herein by reference.

This application is related to:

U.S. patent application Ser. No. 14/480,491 entitled "METHOD AND APPARATUS FOR ASYNCHRONOUS PROCESSOR WITH FAST AND SLOW MODE" filed on Sep. 8, 2014, which is incorporated herein by reference;

U.S. patent application Ser. No. 14/480,573 entitled "METHOD AND APPARATUS FOR ASYNCHRONOUS PROCESSOR WITH AUXILIARY ASYNCHRONOUS VECTOR PROCESSOR" filed on Sep. 8, 2014, which is incorporated herein by reference;

U.S. patent application Ser. No. 14/480,561 entitled "METHOD AND APPARATUS FOR ASYNCHRONOUS PROCESSOR WITH A TOKEN RING BASED PARALLEL PROCESSOR SCHEDULER" filed on Sep. 8, 2014, which is incorporated herein by reference;

U.S. patent application Ser. No. 14/480,522 entitled "METHOD AND APPARATUS FOR ASYNCHRONOUS PROCESSOR REMOVAL OF META-STABILITY" filed on Sep. 8, 2014, which is incorporated herein by reference; and U.S. patent application Ser. No. 14/480,531 entitled "METHOD AND APPARATUS FOR ASYNCHRONOUS PROCESSOR BASED ON CLOCK DELAY ADJUSTMENT" filed on Sep. 8, 2014, which is incorporated herein by reference.

TECHNICAL FIELD

The present disclosure relates generally to asynchronous processors, and more particularly to an asynchronous processor pipeline and bypass.

BACKGROUND

High performance synchronous digital processing systems utilize pipelining to increase parallel performance and throughput. In synchronous systems, pipelining results in many partitioned or subdivided smaller blocks or stages and a system clock is applied to registers between the blocks/stages. The system clock initiates movement of the processing and data from one stage to the next, and the processing in each stage must be completed during one fixed clock cycle. When certain stages take less time than a clock cycle to complete processing, the next processing stages must wait—increasing processing delays (which are additive).

In contrast, asynchronous systems (i.e., clockless) do not utilize a system clock and each processing stage is intended, in general terms, to begin its processing upon completion of processing in the prior stage. Several benefits or features are present with asynchronous processing systems. Each processing stage can have a different processing delay, the input data can be processed upon arrival, and consume power only on demand.

FIG. 1 illustrates a prior art Sutherland asynchronous micro-pipeline architecture 100. The Sutherland asynchronous micro-pipeline architecture is one form of asynchronous micro-pipeline architecture that uses a handshaking protocol built by Muller-C elements to control the micro-pipeline building blocks. The architecture 100 includes a plurality of computing logic 102 linked in sequence via flip-flops or latches 104 (e.g., registers). Control signals are passed between the computing blocks via Muller C-elements 106 and delayed via delay logic 108. Further information describing this architecture 100 is published by Ivan Sutherland in Communications of the ACM Volume 32 Issue 6, June 1989 pages 720-738, ACM New York, N.Y., USA, which is incorporated herein by reference.

Now turning to FIG. 2, there is illustrated a typical section of a synchronous system 200. The system 200 includes flip-flops or registers 202, 204 for clocking an output signal (data) 206 from a logic block 210. On the right side of FIG. 2 there is shown an illustration of the concept of meta-stability. Set-up times and hold times must be considered to avoid meta-stability. In other words, the data must be valid and held during the set-up time and the hold time, otherwise a set-up violation 212 or a hold violation 214 may occur. If either of these violations occurs, the synchronous system may malfunction. The concept of meta-stability also applies to asynchronous systems. Therefore, it is important to design asynchronous systems to avoid meta-stability. In addition, like synchronous systems, asynchronous systems also need to address various potential data/instruction hazards, and should include a bypassing mechanism and pipeline interlock mechanism to detect and resolve hazards.

Accordingly, there are needed asynchronous processing systems, asynchronous processors, and methods of asynchronous processing that are stable and detect and resolve potential hazards.

SUMMARY

According to one embodiment, there is provided a clockless asynchronous processor. The asynchronous processor comprises a plurality of parallel asynchronous processing unit cores, each processing unit core configured to generate an instruction execution result. The asynchronous processor comprises an asynchronous instruction dispatch unit coupled to each asynchronous processing unit core. The instruction dispatch unit is configured to receive multiple instructions from memory and dispatch individual instructions to each of the processing unit cores.

In another embodiment, there is provided a clock-less asynchronous processor. The asynchronous processor comprises a plurality of parallel asynchronous processing logic circuits, each processing logic circuit configured to generate an instruction execution result. The asynchronous processor comprises an asynchronous instruction dispatch unit coupled to each processing logic circuit, the instruction dispatch unit configured to receive multiple instructions from memory and dispatch individual instructions to each of the processing logic circuits. The asynchronous processor comprises a crossbar coupled to an output of each processing logic circuit and to the dispatch unit, the crossbar configured to store the instruction execution results.

In another embodiment, there is provided method for operating an asynchronous processing system comprising a plurality of parallel asynchronous processing units, an instruction dispatch unit coupled to each processing unit, a crossbar coupled to each processing unit and to the dispatch unit, and a register file coupled to each processing unit and to the dispatch unit. The method comprises receiving multiple instructions from memory and dispatching individual instructions to each of the processing units. The method comprises asynchronously processing a first instruction at a first one of the processing units. The method comprises storing a first execution result from the first processing unit in the crossbar. The method comprises storing the first execution result from the first processing unit in the register file.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Asynchronous technology seeks to eliminate the need of synchronous technology for a global clock-tree which not only consumes an important portion of the chip power and die area, but also reduces the speed(s) of the faster parts of the circuit to match the slower parts (i.e., the final clock-tree rate derives from the slowest part of a circuit). To remove the clock-tree (or minimize the clock-tree), asynchronous technology requires special logic to realize a handshaking protocol between two consecutive clock-less processing circuits. Once a clock-less processing circuit finishes its operation and enters into a stable state, a signal (e.g., a "Request" signal) is triggered and issued to its ensuing circuit. If the ensuing circuit is ready to receive the data, the ensuing circuit sends a signal (e.g., an "ACK" signal) to the preceding circuit. Although the processing latencies of the two circuits are different and varying with time, the handshaking protocol ensures the correctness of a circuit or a cascade of circuits.

Hennessy and Patterson coined the term "hazard" for situations in which instructions in a pipeline would produce wrong answers. A structural hazard occurs when two instructions might attempt to use the same resources at the same time. A data hazard occurs when an instruction, scheduled blindly, would attempt to use data before the data is available in the register file.

Figure 3:
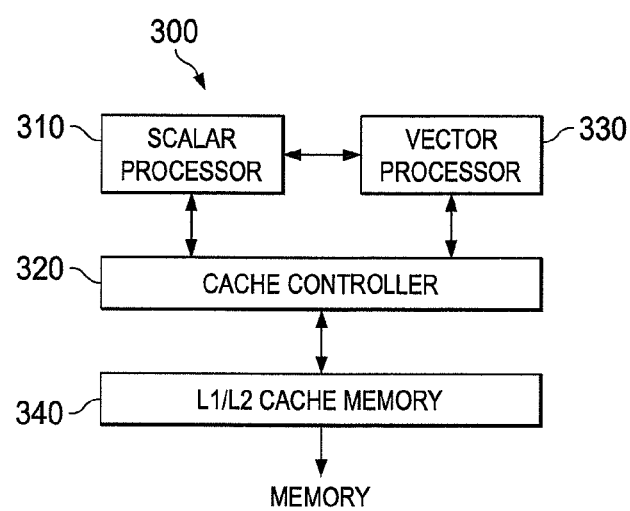
FIG. 3 illustrates an asynchronous processing system in accordance with disclosed embodiments of the present disclosure.
Figure 2:
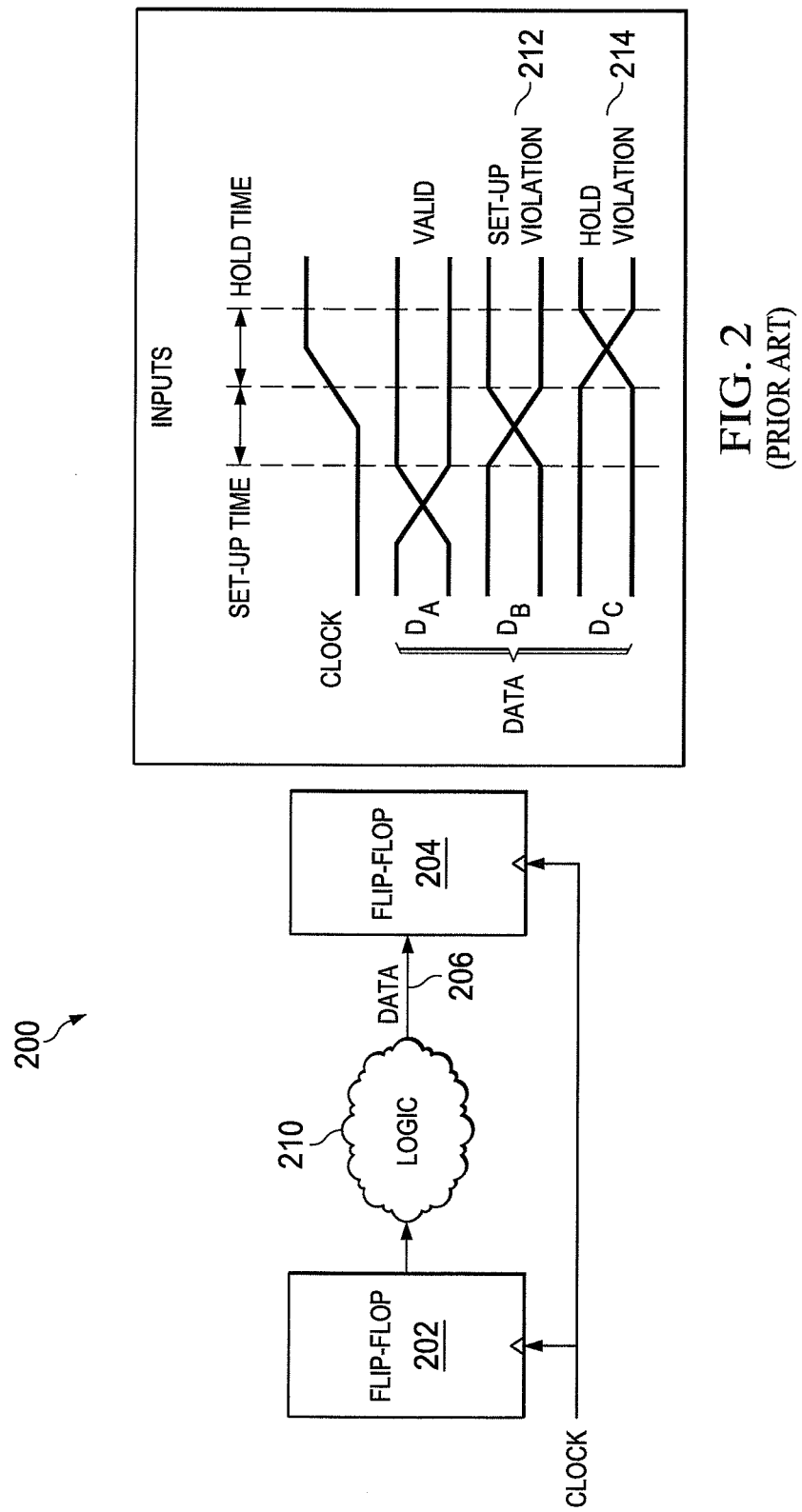
FIG. 2 is a block diagram illustrating the concept of meta-stability in a synchronous system.

With reference to FIG. 3, there is shown a block diagram of an asynchronous processing system 300 in accordance with the present disclosure. The system 300 includes an asynchronous scalar processor 310, an asynchronous vector processor 330, a cache controller 320 and L1/L2 cache memory 340. As will be appreciated, the term "asynchronous processor" may refer to the processor 310, the processor 330, or the processors 310, 330 in combination. Though only one processor 310, 330 is shown, the processing system 300 may include more than one of these processors. In addition, it will be understood that each processor may include therein multiple CPUs, control units, execution units and/or ALUs, etc. For example, the asynchronous scalar processor 310 may include multiple CPUs with each CPU having a desired number of pipeline stages. In one example, the processor 310 may include sixteen CPUs with each CPU having five stages. Similarly, the asynchronous vector processor 330 may include multiple CPUs with each CPU having a desired number of pipeline stages.

The L1/L2 cache memory 340 may be subdivided into L1 and L2 cache, and may also be subdivided into instruction cache and data cache. Likewise, the cache controller 320 may be functionally subdivided.

Figure 4:
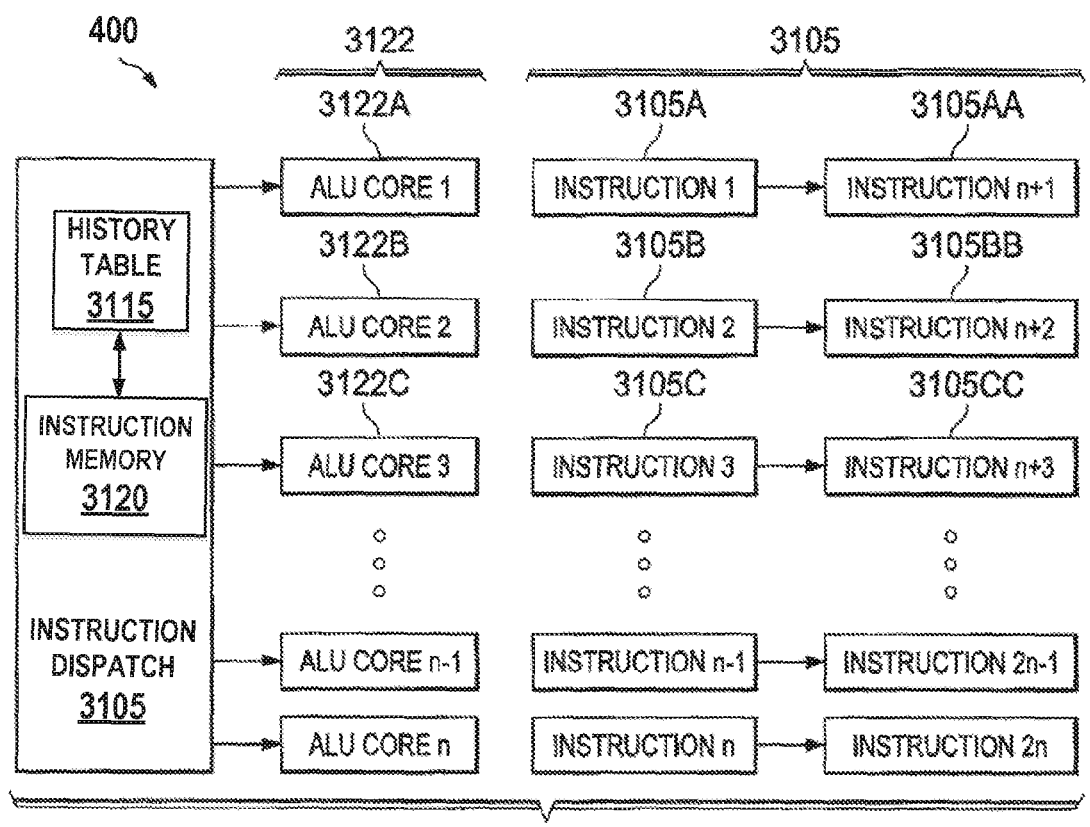
FIG. 4 illustrates a block diagram of a clock-less asynchronous processor architecture having multiple clock-less CPU cores that replace a conventional pipeline in accordance with disclosed embodiments of the present disclosure.

Now turning to FIG. 4, there is illustrated a clock-less asynchronous processor architecture 400 having multiple clock-less execution units 3122 that replace a conventional pipeline. For example, in a typical synchronous processor design, there is a single CPU core and the execution of instructions is based on stages (e.g., instruction fetch, instruction decode, instruction execution, etc.) and a global clock. When a particular instruction has finished a particular instruction stage, the next instruction can enter that stage, and so on. The present disclosure provides a plurality of clock-less execution units 3122 in parallel, where each of the execution units 3122 is configured to execute a corresponding instruction so that multiple instructions are executing simultaneously. The clock-less instruction dispatcher 3105 is configured to dispatch one or more instructions and to drive the execution units 3122. In a particular implementation, each execution unit 3122 may be an ALU.

For example, during operation, each ALU core 3122 is configured to execute a corresponding instruction. To illustrate, the instruction dispatcher 3105 is configured to dispatch a first instruction (e.g., instruction 1 3105A) to a first ALU core (e.g., ALU Core 1 3122A) for execution of the first instruction 3105A, dispatch a second instruction (e.g., instruction 2 3105B) to a second ALU core (e.g., ALU Core 2 3122B) for execution of the second instruction 3105B, dispatch a third instruction (e.g., instruction 3 3105C) to a third ALU core (e.g., ALU Core 3 3122C) for execution of the third instruction 3105C, etc. until N instructions have been dispatched to the corresponding N ALUs.

While the first instruction 3105A is being executed by the first ALU core 3122A, the instruction dispatcher 3105 is configured to dispatch another instruction (e.g., instruction N+1 3105AA) to the first ALU core 3122A to be executed (e.g., the other instruction is pre-fetched). It will be appreciated that the other instruction dispatched to the first ALU core 3122A is the next sequential instruction after instruction N (e.g., N+1). The instruction N+1 can be launched after the instruction N has finished executing. Similarly, while the second instruction 3105B is being executed by the second ALU core 3122B, the instruction dispatcher 3105 is configured to dispatch another instruction (e.g., instruction N+2 3105BB) to the second ALU core 3122B to be executed, while the third instruction 3105C is being executed by the third ALU core 3122C, the instruction dispatcher 3105 is configured to dispatch another instruction (e.g., instruction N+3 3105CC) to the third ALU core 3122C to be executed, etc. The pre-fetched instruction for each ALU is held in the corresponding ALU instruction register 3114 illustrated in FIG. 7.

Figure 5:
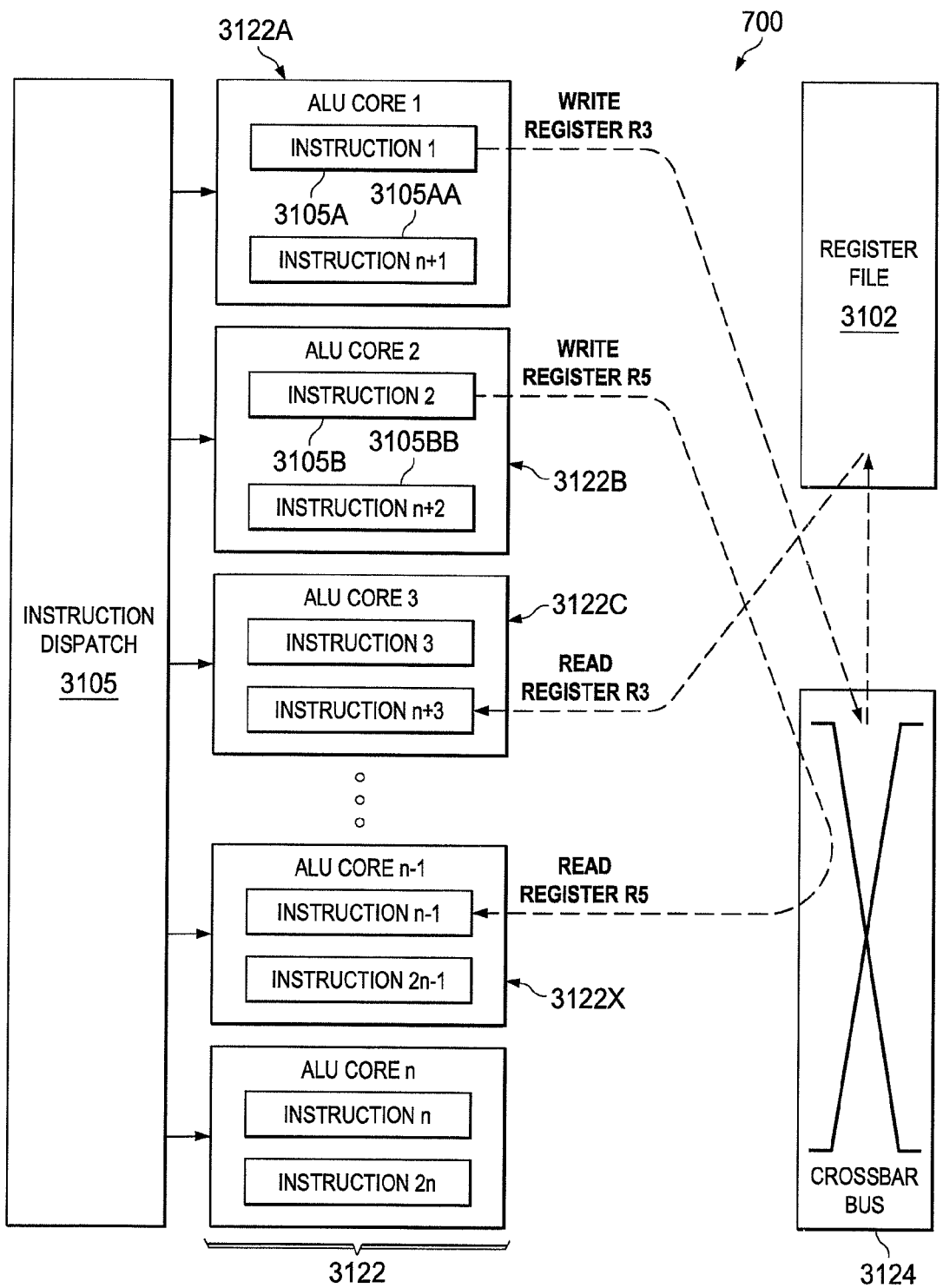
FIG. 5 illustrates a block diagram of a system for reducing register read/write bandwidth in accordance with disclosed embodiments of the present disclosure.

FIG. 5 illustrates a system 700 for reducing register read/write bandwidth. The system 700 comprises the instruction dispatcher 3105, the execution units 3122, the register file 3102, and the crossbar 3124. The instruction dispatcher 3105 is configured to decode an instruction received from memory/cache, determine the timing for the instruction, calculate data dependency based on a history table, and update the history table. The crossbar 3124 is configured to provide bypassing of the register file 3102 by providing access to execution results of a given ALU core without the ALU core having to perform a fetch operation to obtain the execution results from the register file 3102.

To illustrate, the instruction dispatcher 3105 may dispatch the first instruction 3105A to the first ALU core 3122A for execution. After the first instruction 3105A is executed by the first ALU core 3122A, the result may be written to register R3 in the register file 3102. In addition, the result of the execution of the first instruction 3105A (hereinafter "first instruction execution result") may be written to the crossbar 3124. The first instruction execution result may remain on the crossbar 3124 until the next ALU core 1 instruction (i.e., instruction N+1 3105AA) is executed by the first ALU core 3122A, at which point the first instruction execution result is removed from the crossbar 3124. Similarly, after the second instruction 3105B is dispatched to and executed by the second ALU core 3122B, the result of the execution of the second instruction 3105B (hereinafter "second instruction execution result") may be written to register R5 in the register file 3102 and to the crossbar 3124. The second instruction execution result may remain on the crossbar 3124 until the next ALU core 2 instruction (i.e., instruction N+2 3105BB) is executed by the second ALU core 3122B, at which point the second instruction execution result is removed from the crossbar 3124.

As another illustrative example, at a later point in time the ALU core n−1 3122X performs a register read R5. As illustrated, the result of the register write R5 is still on the crossbar 3124 as determined by the instruction dispatcher 3105. As a result, the register file 3102 may be bypassed (e.g., no fetch needed) and the result of the register write R5 may be obtained from the crossbar 3124, saving the bandwidth of a fetch operation to obtain the execution results from the register file 3102.

At a later point in time, the third ALU core 3122C performs a read of register R3. As illustrated, the result of the register write R3 is no longer on the crossbar 3124 as the execution of instruction N+1 will remove R3 from the crossbar 3124. As a result, the result of register write R3 needs to be fetched from the register file 3102, which uses processor resources such as bandwidth.

Figure 1:
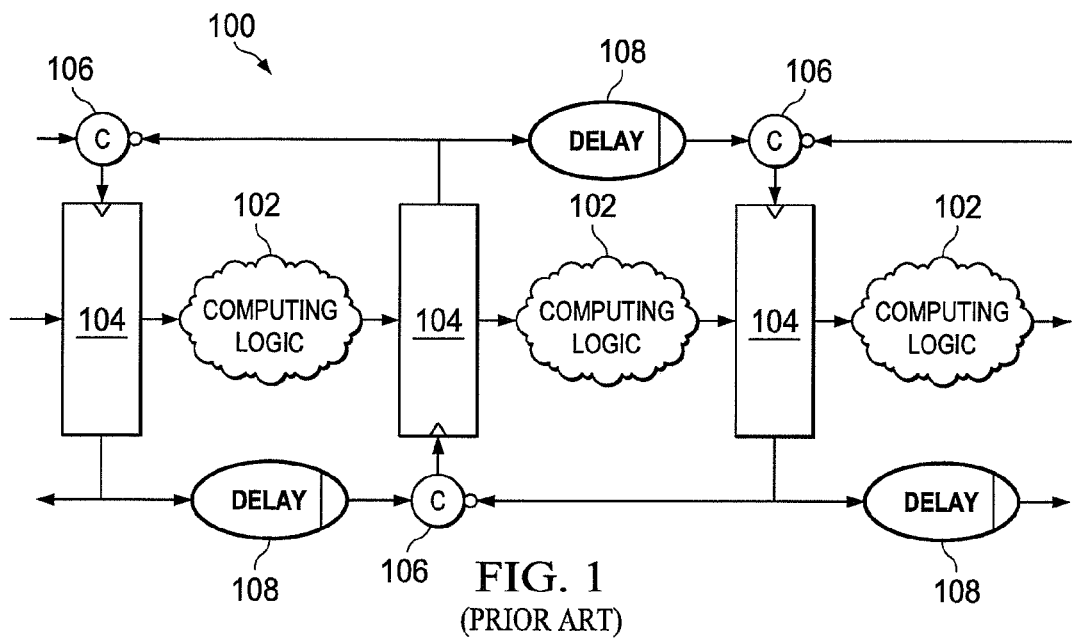
FIG. 1 illustrates a prior art asynchronous micro-pipeline architecture.
Figure 6:
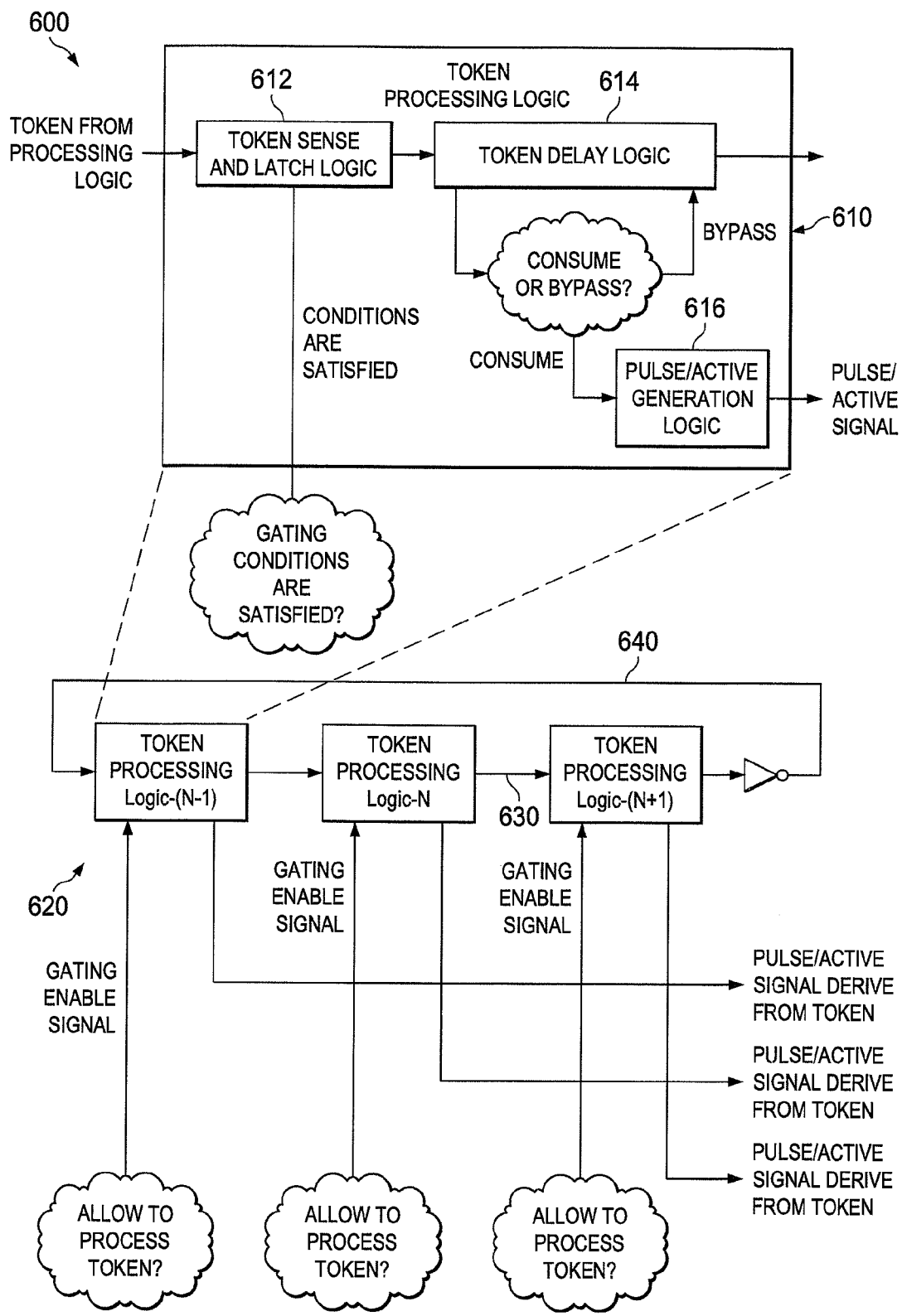
FIG. 6 illustrates a token ring architecture in accordance with disclosed embodiments of the present disclosure.

FIG. 6 illustrates an example of a token ring architecture 600 as an alternative to the architecture above in FIG. 1. The components of this architecture are supported by standard function libraries for chip implementation. For example, the token ring architecture 600 comprises a token processing logic unit 610. The token processing logic 610 comprises token-sense-latch-logic 612 and a variable delay chain 614. In some embodiments, the token processing logic unit 610 may also comprise pulse/active generation logic 616. The token processing logic unit 610 may include any suitable circuitry for detecting reception of a token. The token processing logic unit 610 is configured to propagate the token from one processing component to other processing components along a token signal path.

As described above with respect to FIG. 1, the Sutherland asynchronous micro pipeline architecture requires the handshaking protocol, which is realized by the non-standard Muller-C elements. In order to avoid using Muller-C elements (as in FIG. 1), a series of token processing logic units are used to control the processing of different computing logic (not shown), such as processing units on a chip (e.g., ALUs) or other functional calculation units, or the access of the computing logic to system resources, such as registers or memory. To cover the long latency of some computing logic, the token processing logic unit 610 is replicated to several copies and arranged in a series of token processing logic units as shown at 620. Each token processing logic unit 610 in the series 620 controls the passing of one or more token signals 630 (associated with one or more resources). A token signal 630 passing through the token processing logic units in series 620 forms a token ring 640. The token ring 640 regulates the access of the computing logic (not shown) to the system resource (e.g., memory, register) associated with that token signal. The token processing logic 610 accepts, holds, and passes the token signal 630 between each other in a sequential manner. When the token signal 630 is held by the token processing logic 610, the computing logic associated with that token processing logic is granted the exclusive access to the resource corresponding to that token signal, until the token signal is passed to a next token processing logic in the ring. Holding and passing the token signal concludes the computing logic's access or use of the corresponding resource, and is referred to herein as consuming the token. Once the token is consumed, it is released by the given token processing logic unit to a subsequent token processing logic unit in the ring.

Figure 7:
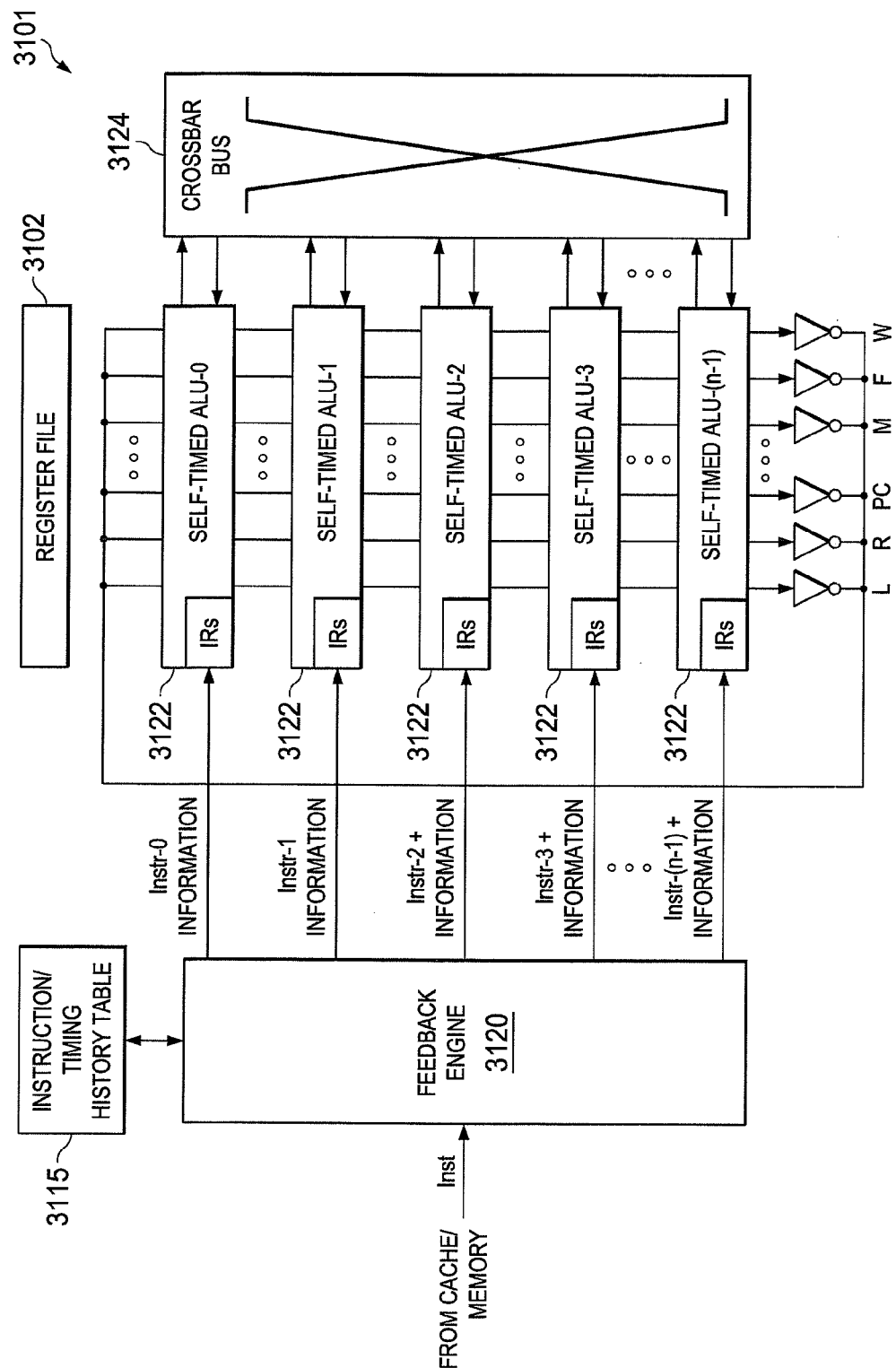
FIG. 7 illustrates a block diagram of a portion of a token-based asynchronous scalar processor in accordance with disclosed embodiments of the present disclosure.

FIG. 7 illustrates an asynchronous processor architecture 3101. The architecture includes a plurality of self-timed (asynchronous) arithmetic and logic units (ALUs) 3122 coupled in parallel in a token ring architecture as described above with respect to FIG. 6. Each ALU 3122 may correspond to the token processing logic unit 610 of FIG. 6. The asynchronous processor architecture 3101 also includes a feedback engine 3120 for properly distributing incoming instructions between the ALUs 3122, an instruction/timing history table 3115 accessible by the feedback engine 3120 for determining the distribution of instructions, a register (memory) 3102 accessible by the ALUs 3122, and a crossbar 3124 for exchanging needed information between the ALUs 3122. The history table 3115 is used for indicating timing and dependency information between multiple input instructions to the processor system. Instructions from the instruction cache/memory are received by the feedback engine 3120 which detects or calculates the data dependencies and determines the timing for instructions using the history table 3115. The feedback engine 3120 pre-decodes each instruction to decide how many input operands this instruction requires. The feedback engine 3120 then looks up the history table 3115 to find whether this piece of data is on the crossbar 3124 or on the register file 3102. If the data is found on the crossbar 3124, the feedback engine 3120 calculates which ALU produces the data. This information is tagged to the instruction dispatched to the ALUs 3122. The feedback engine 3120 also updates the history table 3115 accordingly.

Figure 8:
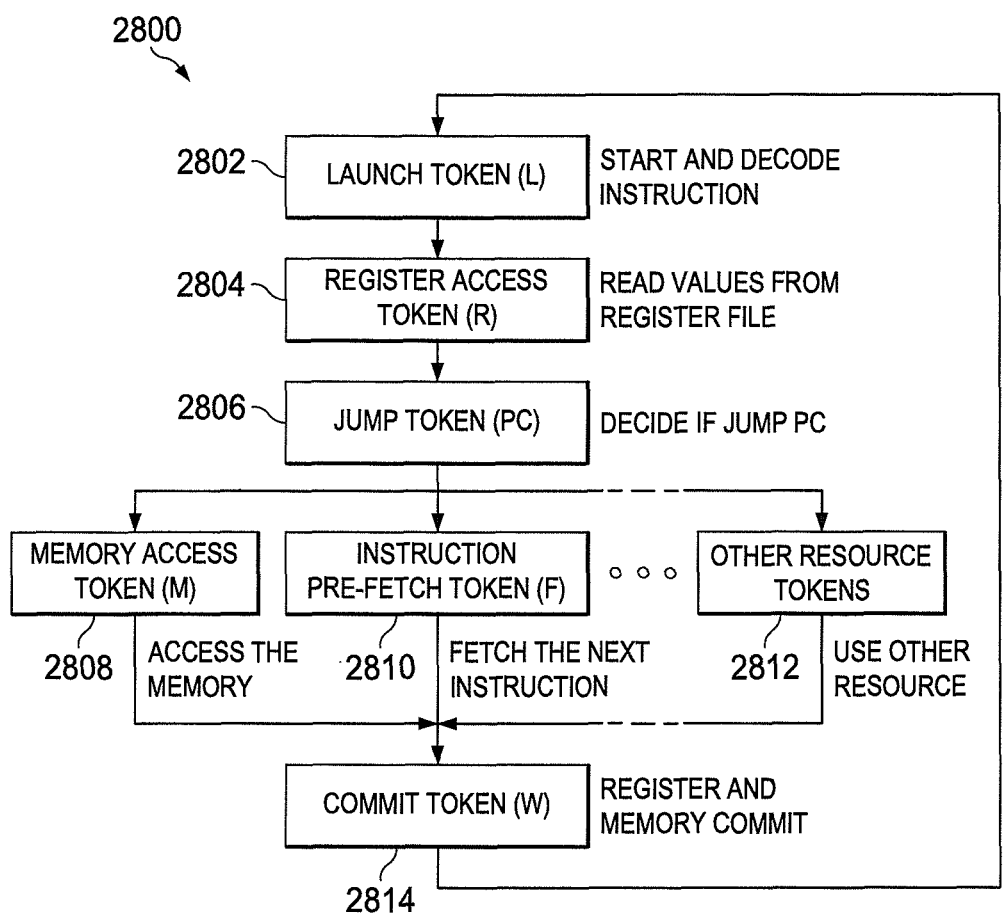
FIG. 8 illustrates a block diagram of token based pipelining for an intra-CPU token gating system in accordance with disclosed embodiments of the present disclosure.

FIG. 8 illustrates token based pipelining with gating within an ALU, also referred to herein as token based pipelining for an intra-ALU token gating system 2800. The intra-ALU token gating system 2800 comprises a plurality of tokens including a launch token 2802 associated with a start and decode instruction, a register access token 2804 associated with reading values from a register file, a jump token 2806 associated with a program counter jump, a memory access token 2808 associated with accessing a memory, an instruction pre-fetch token 2810 associated with fetching the next instruction, an other resources token 2812 associated with use of other resources, and a commit token 2814 associated with register and memory commit.

Designated tokens are used to gate other designated tokens in a given order of the pipeline. This means that when a designated token passes through an ALU, a second designated token is then allowed to be processed and passed by the same ALU in the token ring architecture. In other words, releasing one token by the ALU becomes a condition to consume (process) another token in that ALU in that given order.

A particular example of a token-gating relationship is illustrated in FIG. 8. It will be appreciated by one skilled in the art that other token-gating relationships may be used. In the illustrated example, the launch token (L) 2802 gates the register access token (R) 2804, which in turn gates the jump token (PC token) 2806. The jump token 2806 gates the memory access token (M) 2808, the instruction pre-fetch token (F) 2810, and possibly other resource tokens 2812 that may be used. This means that tokens (M) 2808, (F) 2810, and other resource tokens 2812 can only be consumed by the ALU after passing the jump token 2806. These tokens gate the commit token (W) 2814 to register or memory. The commit token 2814 is also referred to herein as a token for writing the instruction. The commit token 2814 in turn gates the launch token 2802. The gating signal from the gating token (a token in the pipeline) is used as input into a consumption condition logic of the gated token (the token in the next order of the pipeline). For example, the launch token (L) 2802 generates an active signal to the register access or read token (R) 2804, when the launch token (L) 2802 is released to the next ALU. This guarantees that any ALU would not read the register file until an instruction is actually started by the launch token 2802.

Figure 9:
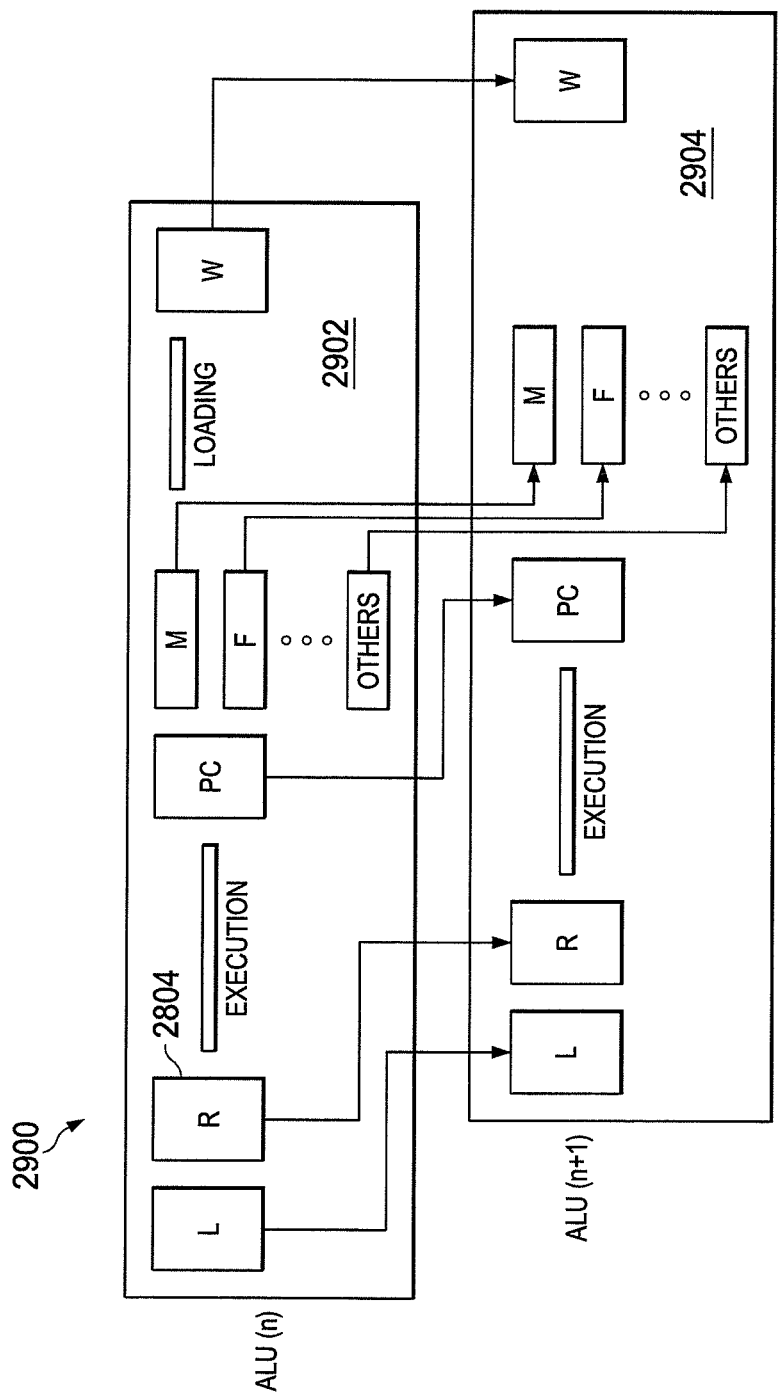
FIG. 9 illustrates a block diagram illustrates of token based pipelining for an inter-CPU token passing system in accordance with disclosed embodiments of the present disclosure.

FIG. 9 illustrates token based pipelining for an inter-ALU token passing system 2900. The inter-ALU token passing system 2900 comprises a first ALU 2902 and a second ALU 2904. A consumed token signal triggers a pulse to a common resource. For example, the register read token 2804 in the first CPU 2902 triggers a pulse to the register file (not shown). The token signal is delayed before it is released to the next ALU (e.g., the second ALU 2904) for a period of time such that there is no structural hazard on this common resource (e.g., the register file) between the first ALU 2902 and the second ALU 2904. The tokens not only preserve multiple ALUs from launching and committing (or writing) instructions in the program counter (PC) order, but also avoid structural hazard among the multiple ALUs.

Aspects of the present disclosure provide architectures and techniques for utilizing crossbars in asynchronous co-processing systems. An asynchronous co-processing system may include a processor and one or more co-processor(s), where the processor and/or one or more of the co-processors are asynchronous. Aspects of the present disclosure allow the processor and co-processor to operate off a common (e.g., merged) crossbar or off separate crossbars. The processor or the co-processor may be the asynchronous scalar processor 310, the asynchronous vector processor 330, or any combination thereof.

Figure 10:
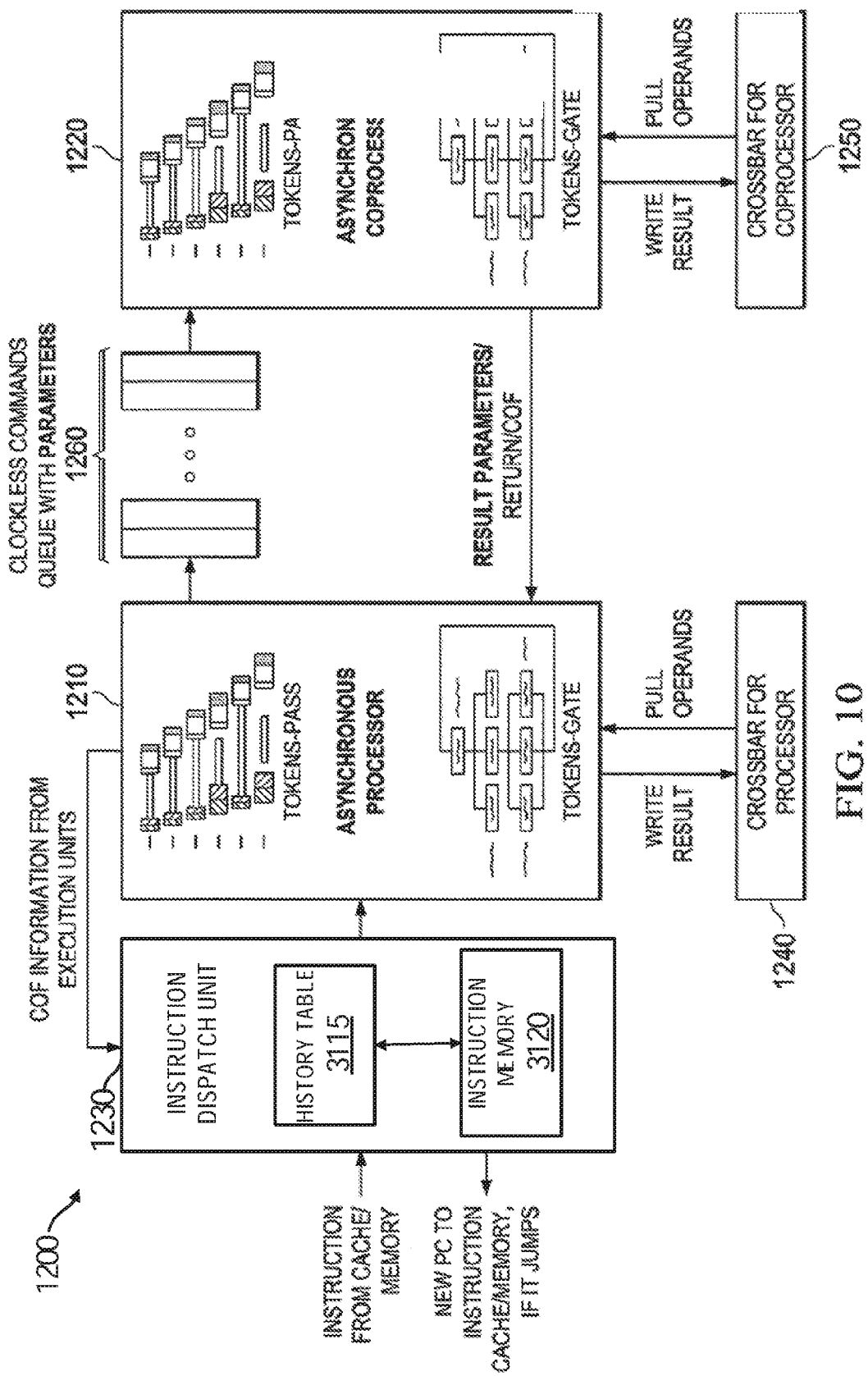
FIG. 10 illustrates a block diagram of a co-processing system in which a first asynchronous processor operates off a different crossbar than a second asynchronous processor in accordance with disclosed embodiments of the present disclosure.

FIG. 10 illustrates a co-processing system 1200 in which a first asynchronous processor 1210 operates off a different crossbar than a second asynchronous processor 1220 (e.g., a co-processor). A dispatch unit 1230 is configured to detect data hazards and calculate data dependencies for both the first processor 1210 and the second processor 1220. The dispatch unit 1230 may be the instruction dispatcher 3105 of FIG. 5. A first crossbar 1240 is coupled to the first processor 1210. A second crossbar 1250 is coupled to the second processor 1220.

During operation, the instruction dispatch unit 1230 receives an instruction from cache/memory, decodes the received instruction, and dispatches the decoded instruction to the first processor 1210. The first processor 1210 determines whether the instruction will be executed by the first processor 1210 or the co-processor 1220. If the instruction is to be executed by the first processor 1210, then the first processor 1210 executes the instruction and writes the result in the first crossbar 1240. If the instruction is to be executed by the co-processor 1220, then the first processor 1210 writes the instruction into a queue 1260. Thereafter, the co-processor 1220 pulls or reads the instruction from the queue 1260, executes the instruction, and writes the result in the second crossbar 1250. In addition, the co-processor 1220 writes the result back to the first processor 1210 through the result parameters return/COF port. When utilizing different crossbars, the first processor 1210 and the co-processor 1220 communicate parameters such as instructions and result parameters over the queue 1260 and result parameters return/COF port.

Figure 11:
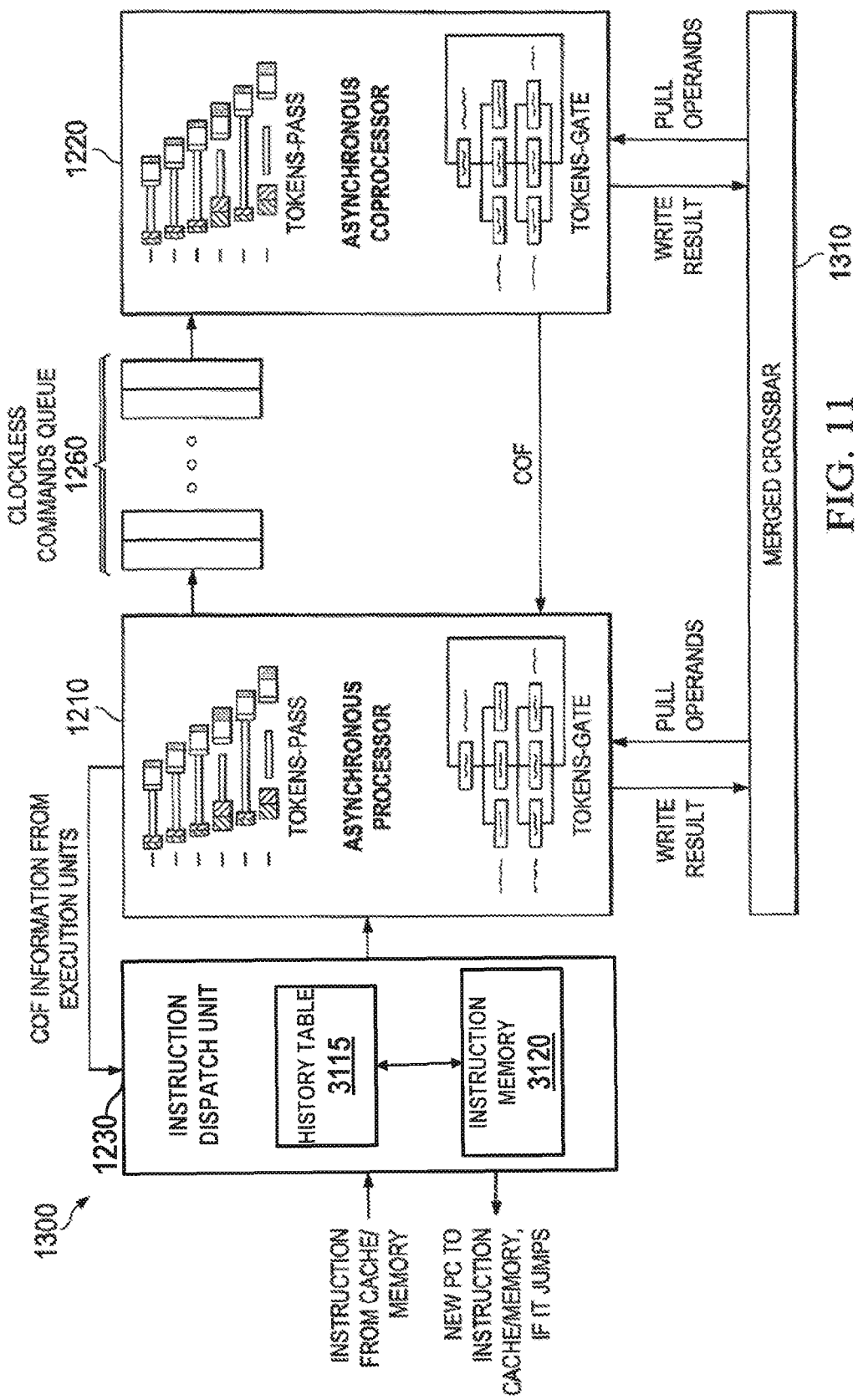
FIG. 11 illustrates a block diagram of a co-processing system in which a first asynchronous processor and a second asynchronous processor operate off a common/merged crossbar in accordance with disclosed embodiments of the present disclosure.

FIG. 11 illustrates a co-processing system 1300 in which the first processor 1210 and the co-processor 1220 operate off a common/merged crossbar 1310. Notably, when utilizing the common/merged crossbar 1310, the first processor 1210 and the co-processor 1220 read and write the parameters directly to/from the same crossbar (i.e., the common/merged crossbar 1310), and therefore need not communicate parameters over the result parameters return/COF port. This can increase processing efficiency by reducing the time required to exchange parameters, reducing duplicative write operations, and reducing congestion in the result parameters return/COF port. However, the merged/common crossbar 1310 is much larger and more complex than the separate crossbars, and therefore may not be suitable for some implementations. When a common crossbar is used, the first processor 1210 may view the co-processor 1220 as a group of "special" computation resources.

Figure 12:
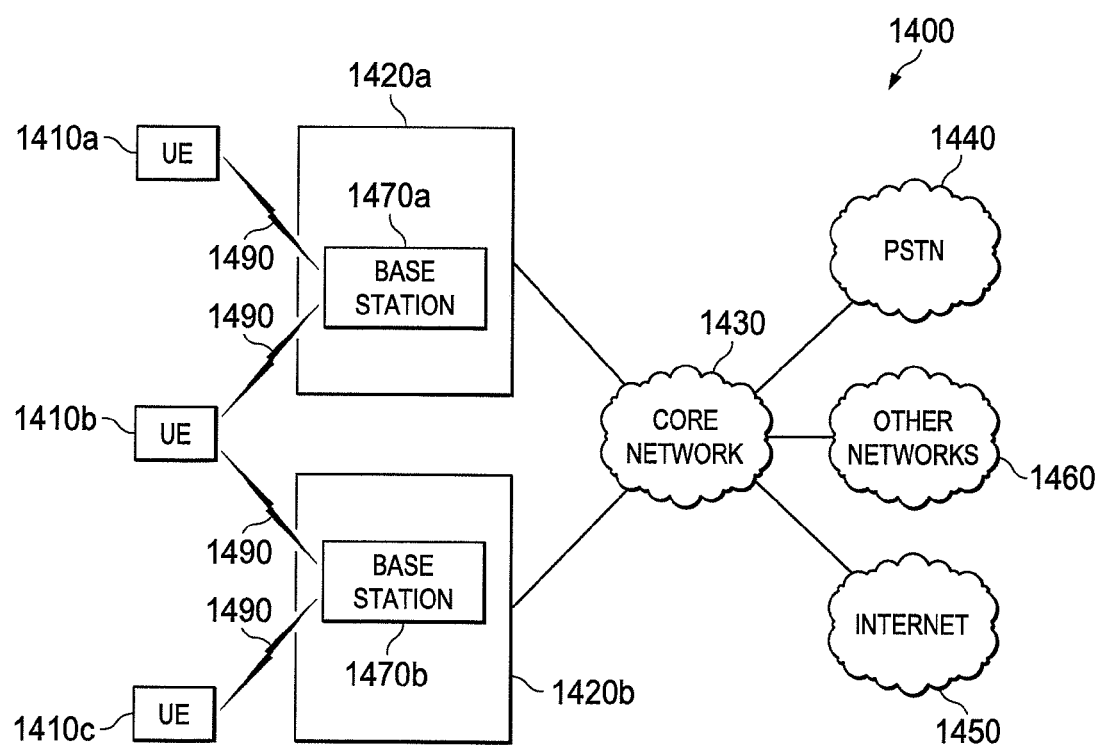
FIG. 12 illustrates an example communication system in which the asynchronous processor and processing system may be utilized.

FIG. 12 illustrates an example communication system 1400 that may be used for implementing the devices and methods disclosed herein. In general, the system 1400 enables multiple wireless users to transmit and receive data and other content. The system 1400 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1400 includes user equipment (UE) 1410a-1410c, radio access networks (RANs) 1420a-1420b, a core network 1430, a public switched telephone network (PSTN) 1440, the Internet 1450, and other networks 1460. While certain numbers of these components or elements are shown in FIG. 12, any number of these components or elements may be included in the system 1400.

The UEs 1410a-1410c are configured to operate and/or communicate in the system 1400. For example, the UEs 1410a-1410c are configured to transmit and/or receive wireless signals or wired signals. Each UE 1410a-1410c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 1420a-1420b here include base stations 1470a-1470b, respectively. Each base station 1470a-1470b is configured to wirelessly interface with one or more of the UEs 1410a-1410c to enable access to the core network 1430, the PSTN 1440, the Internet 1450, and/or the other networks 1460. For example, the base stations 1470a-1470b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 12, the base station 1470a forms part of the RAN 1420a, which may include other base stations, elements, and/or devices. Also, the base station 1470b forms part of the RAN 1420b, which may include other base stations, elements, and/or devices. Each base station 1470a-1470b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1470a-1470b communicate with one or more of the UEs 1410a-1410c over one or more air interfaces 1490 using wireless communication links. The air interfaces 1490 may utilize any suitable radio access technology.

It is contemplated that the system 1400 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 1420a-1420b are in communication with the core network 1430 to provide the UEs 1410a-1410c with voice, data, application, Voice over Internet Protocol (VoIP), or other services. Understandably, the RANs 1420a-1420b and/or the core network 1430 may be in direct or indirect communication with one or more other RANs (not shown). The core network 1430 may also serve as a gateway access for other networks (such as PSTN 1440, Internet 1450, and other networks 1460). In addition, some or all of the UEs 1410a-1410c may include functionality for communicating with different wireless networks over different wireless links using different wireless technologies and/or protocols.

Although FIG. 12 illustrates one example of a communication system, various changes may be made to FIG. 12. For example, the communication system 1400 could include any number of UEs, base stations, networks, or other components in any suitable configuration, and can further include the EPC illustrated in any of the figures herein.

Figure 13A:
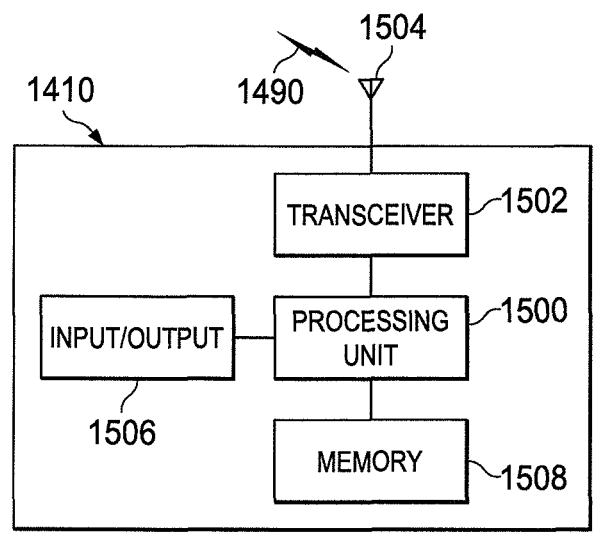
FIGS. 13A and 13B illustrate example devices in which the asynchronous processor and processing system may be utilized.
Figure 13B:
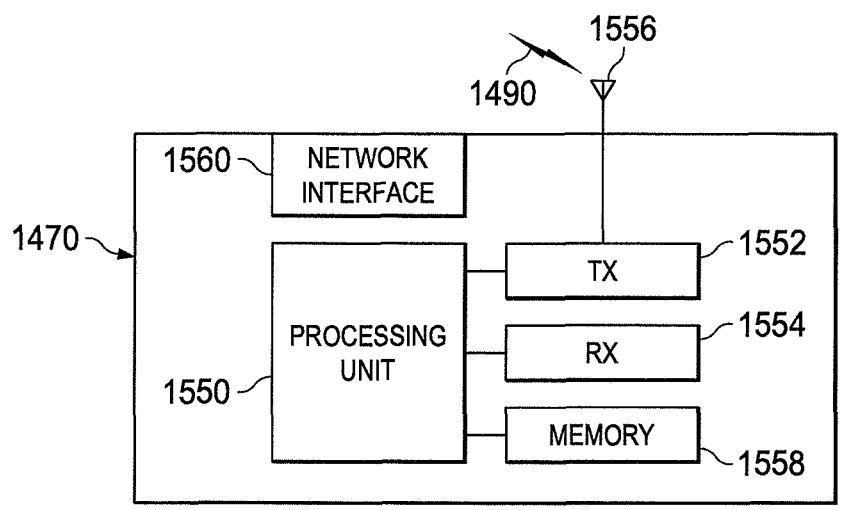

FIGS. 13A and 13B illustrate example devices that may implement the methods and teachings according to this disclosure. In particular, FIG. 13A illustrates an example UE 1410, and FIG. 13B illustrates an example base station 1470. These components could be used in the system 1400 of FIG. 12 or in any other suitable system.

As shown in FIG. 13A, the UE 1410 includes at least one processing unit 1500. The processing unit 1500 implements various processing operations of the UE 1410. For example, the processing unit 1500 could perform signal coding, data processing, power control, input/output processing, or any other functionality enabling the UE 1410 to operate in the system 1400. The processing unit 1500 also supports the methods and teachings described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit. The processing unit 1500 may be an asynchronous processor as described herein.

The UE 1410 also includes at least one transceiver 1502. The transceiver 1502 is configured to modulate data or other content for transmission by at least one antenna 1504. The transceiver 1502 is also configured to demodulate data or other content received by the at least one antenna 1504. Each transceiver 1502 includes any suitable structure for generating signals for wireless transmission and/or processing signals received wirelessly. Each antenna 1504 includes any suitable structure for transmitting and/or receiving wireless signals. One or multiple transceivers 1502 could be used in the UE 1410, and one or multiple antennas 1504 could be used in the UE 1410. Although shown as a single functional unit, a transceiver 1502 could also be implemented using at least one transmitter and at least one separate receiver.

The UE 1410 further includes one or more input/output devices 1506. The input/output devices 1506 facilitate interaction with a user. Each input/output device 1506 includes any suitable structure for providing information to or receiving information from a user, such as a speaker, microphone, keypad, keyboard, display, or touch screen.

In addition, the UE 1410 includes at least one memory 1508. The memory 1508 stores instructions and data used, generated, or collected by the UE 1410. For example, the memory 1508 could store software or firmware instructions executed by the processing unit(s) 1500 and data used to reduce or eliminate interference in incoming signals. Each memory 1508 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1470 includes at least one processing unit 1500, at least one transmitter 1552, at least one receiver 1554, one or more antennas 1556, one or more network interfaces 1560, and at least one memory 1558. The processing unit 1500 implements various processing operations of the base station 1470, such as signal coding, data processing, power control, input/output processing, or any other functionality. The processing unit 1500 can also support the methods and teachings described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit. The processing unit 1500 may be an asynchronous processor as described herein.

Each transmitter 1552 includes any suitable structure for generating signals for wireless transmission to one or more UEs or other devices. Each receiver 1554 includes any suitable structure for processing signals received wirelessly from one or more UEs or other devices. Although shown as separate components, at least one transmitter 1552 and at least one receiver 1554 could be combined into a transceiver. Each antenna 1556 includes any suitable structure for transmitting and/or receiving wireless signals. While a common antenna 1556 is shown here as being coupled to both the transmitter 1552 and the receiver 1554, one or more antennas 1556 could be coupled to the transmitter(s) 1552, and one or more separate antennas 1556 could be coupled to the receiver(s) 1554. Each memory 1558 includes any suitable volatile and/or non-volatile storage and retrieval device(s).

Additional details regarding UEs 1410 and base stations 1470 are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A clock-less asynchronous processor, comprising:
   a plurality of parallel asynchronous processing unit cores, each parallel asynchronous processing unit core configured to generate an instruction execution result;
   an asynchronous instruction dispatch unit configured to receive multiple instructions from memory and dispatch individual instructions to each of the parallel asynchronous processing unit cores;
   a register file coupled to each asynchronous processing unit core, the register file configured to store the instruction execution results and provide each of the plurality of parallel asynchronous processing unit cores direct access to the instruction execution results stored at the register file; and
   a crossbar coupled to each asynchronous processing unit core, the crossbar configured to store the instruction execution results and to bypass the register file, wherein bypassing the register file provides each of the plurality of parallel asynchronous processing unit cores direct access to the instruction execution results stored at the crossbar.

2. The clock-less asynchronous processor in accordance with claim 1, wherein the crossbar is further coupled to the asynchronous instruction dispatch unit.

3. The clock-less asynchronous processor in accordance with claim 2, wherein the register file is coupled to each asynchronous processing unit core and to the asynchronous instruction dispatch unit.

4. The clock-less asynchronous processor in accordance with claim 3, wherein:
   in response to a first execution result currently stored in the crossbar, a given asynchronous processing unit core is configured to directly obtain the first execution result currently stored from the crossbar and bypass a fetch operation for the first execution result previously stored in the register file; and
   in response to the first execution result not currently being stored in the crossbar, the given asynchronous processing unit core is configured to directly obtain the first execution result from the register file.

5. The clock-less asynchronous processor in accordance with claim 4, wherein the asynchronous instruction dispatch unit is coupled to each asynchronous processing unit core, and comprises:
   a history table configured to indicate timing and data dependency information between the received multiple instructions; and
   an instruction memory configured to distribute incoming instructions based on the timing and data dependency information between the received multiple instructions indicated by the history table.

6. The clock-less asynchronous processor in accordance with claim 1, wherein each asynchronous processing unit core is run-to-completed.

7. The clock-less asynchronous processor in accordance with claim 1, wherein each of the plurality of parallel asynchronous processing unit cores comprises a central processing unit (CPU) or an arithmetic logic unit (ALU).

8. The clock-less asynchronous processor in accordance with claim 2, further comprising a clock-less asynchronous coprocessor comprising a plurality of parallel second asynchronous processing unit cores, each second asynchronous processing unit core configured to generate a second instruction execution result.

9. The clock-less asynchronous processor in accordance with claim 8, wherein the clock-less asynchronous coprocessor is coupled to the crossbar, and wherein the asynchronous instruction dispatch unit is configured to detect data dependency for both the clock-less asynchronous processor and the clock-less asynchronous coprocessor.

10. The clock-less asynchronous processor in accordance with claim 9, wherein the crossbar is common to both the clock-less asynchronous processor and the clock-less asynchronous coprocessor, and wherein the crossbar is configured for use by both the clock-less asynchronous processor and the clock-less asynchronous coprocessor.

11. The clock-less asynchronous processor in accordance with claim 8, wherein the clock-less asynchronous processor comprises a first crossbar coupled to and dedicated for use by the clock-less asynchronous processor, and wherein the clock-less asynchronous coprocessor comprises a second crossbar coupled to and dedicated for use by the clock-less asynchronous coprocessor, the first crossbar separate and distinct from the second crossbar, and wherein the asynchronous instruction dispatch unit is configured to detect data dependency for both the clock-less asynchronous processor and the clock-less asynchronous coprocessor.

12. The clock-less asynchronous processor in accordance with claim 1, wherein each of the plurality of parallel asynchronous processing unit cores comprises multiple sequential processing stages.

13. A clock-less asynchronous processor, comprising:
a plurality of parallel asynchronous processing logic circuits, each parallel asynchronous processing logic circuit configured to generate an instruction execution result;
an asynchronous instruction dispatch unit coupled to each parallel asynchronous processing logic circuit, the asynchronous instruction dispatch unit configured to receive multiple instructions from memory and dispatch individual instructions to each of the parallel asynchronous processing logic circuits;
a register file coupled to each parallel asynchronous processing logic circuit, the register file configured to store the instruction execution results and provide each of the plurality of parallel asynchronous processing logic circuits direct access to the instruction execution results stored at the register file; and
a crossbar coupled to each parallel asynchronous processing logic circuit and to the asynchronous instruction dispatch unit, the crossbar configured to store the instruction execution results and to bypass the register file, wherein bypassing the register file provides each of the plurality of parallel asynchronous processing logic circuits direct access to the instruction execution results stored at the crossbar.

14. The clock-less asynchronous processor in accordance with claim 13, wherein each of the plurality of parallel asynchronous processing logic circuits comprises a central processing unit (CPU) or an arithmetic logic unit (ALU).

15. A method for operating an asynchronous processing system comprising a plurality of parallel asynchronous processing units, an asynchronous instruction dispatch unit coupled to each parallel asynchronous processing unit, a crossbar coupled to each parallel asynchronous processing unit and to the asynchronous instruction dispatch unit, and a register file coupled to each parallel asynchronous processing unit and to the asynchronous instruction dispatch unit, the method comprising:
receiving multiple instructions from memory and dispatching individual instructions to each of the parallel asynchronous processing units;
asynchronously processing a first instruction at a first parallel asynchronous processing unit of the parallel asynchronous processing units;
storing a first execution result from the first parallel asynchronous processing unit in the crossbar;
storing the first execution result from the first parallel asynchronous processing unit in the register file; and
in response to the first execution result being currently stored in the crossbar, directly obtaining the first execution result from the crossbar and bypassing a fetch operation for direct access to the first execution result stored in the register file.

16. The method in accordance with claim 15, further comprising
in response to the first execution result not currently being stored in the crossbar, obtaining the first execution result directly from the register file.

17. The method in accordance with claim 15, each of the plurality of parallel asynchronous processing units comprising a central processing unit (CPU) or an arithmetic logic unit (ALU), and the asynchronously processing the first instruction at the first parallel asynchronous processing unit comprising asynchronously processing the first instruction at a first CPU or ALU.

18. The method in accordance with claim 15, further comprising:
indicating a timing and data dependency information between the received multiple instructions; and
distributing incoming instructions based on the timing and data dependency information between the received multiple instructions.

* * * * *